United States Patent
Sudo et al.

(10) Patent No.: US 7,849,058 B2
(45) Date of Patent: Dec. 7, 2010

(54) STORAGE SYSTEM DETERMINING EXECUTION OF BACKUP OF DATA ACCORDING TO QUALITY OF WAN

(75) Inventors: Azusa Sudo, Kawasaki (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 12/068,087

(22) Filed: Feb. 1, 2008

(65) Prior Publication Data

US 2009/0083345 A1    Mar. 26, 2009

(30) Foreign Application Priority Data

Sep. 26, 2007   (JP) ............................. 2007-249797

(51) Int. Cl.
*G06F 17/30* (2006.01)
(52) U.S. Cl. .................. 707/640; 707/643; 707/674; 707/678; 707/679; 707/681
(58) Field of Classification Search ................ 707/640, 707/661, 662, 663, 665, 666, 674, 678, 681
See application file for complete search history.

(56) References Cited

U.S. PATENT DOCUMENTS

| | | | | |
|---|---|---|---|---|
| 5,758,359 | A * | 5/1998 | Saxon | 1/1 |
| 7,152,080 | B2 * | 12/2006 | Mikami | 1/1 |
| 7,421,460 | B2 * | 9/2008 | Chigusa et al. | 1/1 |
| 7,653,652 | B2 * | 1/2010 | Kagalwala et al. | 707/999.103 |
| 7,657,720 | B2 * | 2/2010 | Otani | 711/162 |
| 2003/0105732 | A1 * | 6/2003 | Kagalwala et al. | 707/1 |
| 2004/0098423 | A1 * | 5/2004 | Chigusa et al. | 707/204 |
| 2005/0027725 | A1 * | 2/2005 | Kagalwala et al. | 707/100 |
| 2005/0076070 | A1 * | 4/2005 | Mikami | 707/204 |
| 2007/0055716 | A1 * | 3/2007 | Mikami | 707/204 |
| 2007/0220319 | A1 * | 9/2007 | Desai et al. | 714/13 |
| 2008/0059733 | A1 * | 3/2008 | Otani | 711/162 |
| 2008/0320219 | A1 * | 12/2008 | Okada et al. | 711/114 |

FOREIGN PATENT DOCUMENTS

JP    2004-171249    11/2002

* cited by examiner

*Primary Examiner*—Jean M Corrielus
(74) *Attorney, Agent, or Firm*—Volpe and Koenig, P.C.

(57) ABSTRACT

There is provided a storage system providing a storage volume and being coupled via a network to a secondary storage system for storing a backup of data stored in the storage volume, the storage system copies data stored in the storage volume to the secondary storage system, upon receiving an instruction to create a backup; records the size of the data copied; predict the size of data to be copied in the future based on the recorded size of the copied data; records a usable bandwidth of the network at a time when the data is copied to the secondary storage system; predicts a usable bandwidth in the future based on the recorded usable bandwidth of the network; and predicts a time period required for copying data to the secondary storage system based on the predicted size of data to be copied and the predicted usable bandwidth of the network.

19 Claims, 11 Drawing Sheets

FIG. 4A

| TIME | USABLE BANDWIDTH |
|---|---|
| 2007/07/01/20:00 | 10MbpS |
| 2007/07/01/20:30 | 8MbpS |
| 2007/07/01/21:00 | 5MbpS |
| ... | ... |

FIG. 4B

| TIME | LUN | UPDATE DATA AMOUNT |
|---|---|---|
| 2007/07/01/20:00 | 1 | 3GB |
| 2007/07/01/21:00 | 2 | 2.5GB |
| 2007/07/01/22:00 | 1 | 2GB |
| ... | ... | ... |

FIG. 4C

| TIME | PREDICTED USABLE BANDWIDTH |
|---|---|
| 2007/07/08/20:00 | 10MbpS |
| 2007/07/08/20:30 | 8MbpS |
| 2007/07/08/21:00 | 5MbpS |
| ... | ... |

| TIME | LUN | PREDICTED UPDATE DATA AMOUNT |
|---|---|---|
| 2007/07/08/20:00 | 1 | 3GB |
| 2007/07/08/21:00 | 2 | 2.5GB |
| 2007/07/08/22:00 | 1 | 2GB |
| ... | ... | ... |

FIG. 5A

| LUN | LU SIZE | RPO |
|---|---|---|
| 1 | 80GB | 1hour |
| 2 | 50GB | 1day |
| 3 | 35GB | Not Assigned |
| ... | ... | ... |

STORAGE SYSTEM DETERMINING EXECUTION OF BACKUP OF DATA ACCORDING TO QUALITY OF WAN

CLAIM OF PRIORITY

The present application claims priority from Japanese patent application JP 2007-249797 filed on Sep. 26, 2007, the content of which is hereby incorporated by reference into this application.

BACKGROUND

This invention relates to a technology for creating backups of data, and more particularly, to a technology for creating backups via a network having a fluctuating bandwidth.

In companies, as the information technology (IT) is introduced in the business, important business data tends to be stored in storage devices. As a result, the companies take measures such as storing backups of business data at remote locations in case of a large-scale disaster such as an earthquake.

However, investment in the IT is limited in medium- and small-scale companies, and they need inexpensive means for remote backups. For example, they use an inexpensive WAN such as the ADSL and FTTH as the WAN coupling branch offices with each other.

However, the inexpensive WAN such as the ADSL is low in quality compared with a dedicated line, and does not guarantee the bandwidth, and there is thus a problem that an administrator cannot determine whether a remote backup by means of the inexpensive WAN satisfies a recovery point objective (RPO) requirement in advance. The RPO indicates up to which time point data is to be recovered from a time point at which an accident or a failure occurred.

In order to solve the above problem, it is necessary to predict the size of data subject to the backup (hereinafter, referred to as backup data amount), and the bandwidth of the WAN. The prediction of the bandwidth of the WAN is necessary because the bandwidth of a low quality WAN fluctuates. Moreover, as a technology for predicting the backup data amount, JP 2004-171249 A discloses a technology which predicts a main processing amount based on history of amounts of past business operation processing (main processed amounts), and determines whether a backup is to be carried out based on a change in the main processing amount.

However, the technology disclosed in JP 2004-171249 A assumes that the bandwidth of a communication line between a recording medium storing a database and a recording medium for storing a backup of the database is constant. As a result, the technology disclosed in JP 2004-171249 A does not include a technology for predicting a bandwidth if the bandwidth of the WAN fluctuates, and thus cannot solve the above problem.

It is therefore an object of this invention to provide information used for, when data is backed up to a remote location using a WAN having a fluctuating bandwidth, predicting the backup data amount and the fluctuation of the bandwidth of the WAN, and determining whether requirements for creating the backup are satisfied.

SUMMARY

A representative aspect of this invention is as follows. That is, there is provided a storage system providing a storage volume for storing data to be read and written by a host computer, and operating as a main storage system. The storage system is coupled via a network to a secondary storage system for storing a backup of data stored in the storage volume. The storage system comprises an interface coupled to the network; a processor coupled to the interface; and a memory coupled to the processor. The processor copies data stored in the storage volume to the secondary storage system, upon receiving an instruction to create a backup of data stored in the storage volume; records the size of the data copied from the storage volume to the secondary storage system; predicts the size of data to be copied in the future based on the recorded size of the copied data; record a usable bandwidth of the network at a time when the data stored in the storage volume is copied to the secondary storage system; predicts a usable bandwidth in the future based on the recorded usable bandwidth of the network; and predicts a time period required for copying the data stored in the storage volume to the secondary storage system based on the predicted size of data to be copied and the predicted usable bandwidth of the network.

According to an embodiment of this invention, when data is backed up to a remote location via a WAN having a fluctuating bandwidth, it is possible to predict a period required for a copy of the data in consideration of the fluctuation of the bandwidth.

BRIEF DESCRIPTION OF THE DRAWINGS

The present invention can be appreciated by the description which follows in conjunction with the following figures, wherein:

FIG. 4A is a diagram showing a configuration of a usable bandwidth history table in accordance with the embodiment of this invention;

FIG. 4B is a diagram showing a configuration of an update data amount history table in accordance with the embodiment of this invention;

FIG. 4C is a diagram showing a configuration of a predicted usable bandwidth table in accordance with the embodiment of this invention;

FIG. 5A is a diagram showing a configuration of a predicted update data amount table in accordance with the embodiment of this invention;

FIG. 5B is a diagram showing a configuration of an LU table in accordance with the embodiment of this invention;

DETAILED DESCRIPTION OF THE PREFERRED EMBODIMENTS

A description will now be given of the embodiment of this invention with reference to the drawings.

Figure 1:
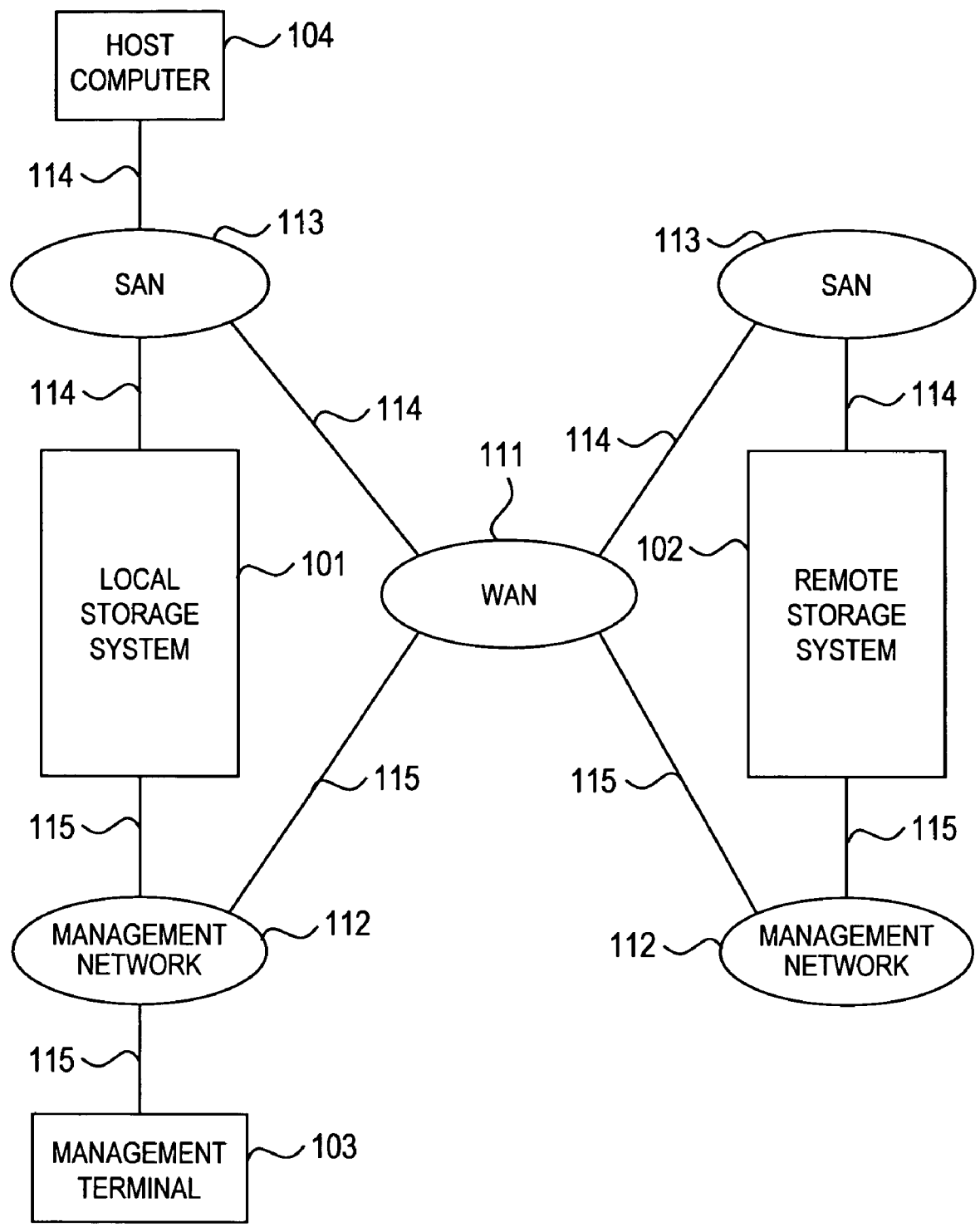
FIG. 1 is a block diagram showing an entire configuration of a storage system in accordance with an embodiment of this invention.

FIG. 1 is a block diagram showing an entire configuration of a computer system according to the embodiment of this invention.

The computer system according to the embodiment of this invention includes a local storage system 101, a remote storage system 102, a management terminal 103, and a host computer (hereinafter, referred to as host) 104. The local storage system 101, the remote storage system 102, the management terminal 103, and the host 104 may be at least one each.

The local storage system 101 and the remote storage system 102 are coupled via a WAN 111. The local storage system 101 and the management terminal 103 are coupled via a management network 112. The local storage system 101 and the host 104 are coupled via a SAN 113.

The local storage system 101 is coupled to the SAN 113 via a communication line 114. Moreover, the local storage system 101 is coupled to the management network 112 via a communication line 115. The remote storage system 102 is coupled to the SAN 113 via a communication line 114, and is coupled to a management network 112 via a communication line 115. The management terminal 103 is coupled to the management network 112 via the communication line 115. The host 104 is coupled to the SAN 113 via a communication line 114. The WAN 111 is coupled to the SAN's 113 via communication lines 114, and is coupled to the management networks 112 via the communication lines 115.

It should be noted that the communication lines 114 and 115 are formed as wired connections such as metal cables and optical fibers. Moreover, the host 104 and the local storage system 101, and the local storage system 101, and the management terminal 103 may be coupled with each other wirelessly. In this case, the communication lines 114 and 115 are not used.

The local storage system 101 provides a storage volume for storing data read or written by the host 104.

The remote storage system 102 stores backup data of data stored in the local storage system 101. According to the embodiment of this invention, the remote storage system 102 is installed at a location remote to an installed location of the local storage system 101.

The management terminal 103 manages the local storage system 101, changes the configuration of the local storage system 101, and sets a schedule for creating backups.

The host 104 executes application programs such as one for business processing, and reads/writes data from/to the local storage system 101.

Figure 2:
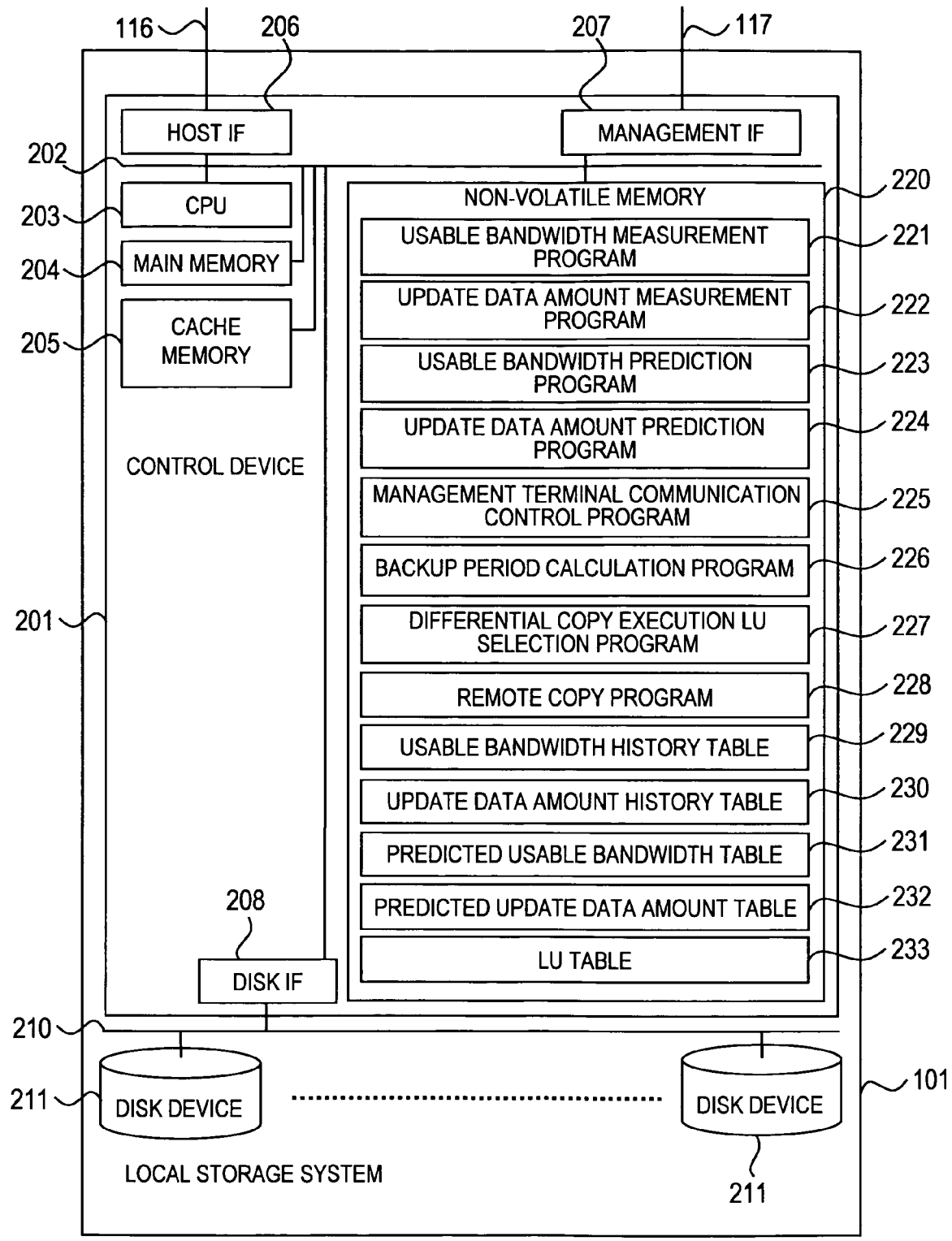
FIG. 2 is a block diagram showing a configuration of a local storage system in accordance with the embodiment of this invention.

FIG. 2 is a block diagram showing a configuration of the local storage system 101 according to the embodiment of this invention.

The local storage system 101 is a storage device system including at least one storage device. The local storage system 101 includes a control device 201 and at least one disk device 211.

The disk device 211 stores data to be read and written by the host 104. According to the embodiment of this invention, a hard disk device is used as the disk device 211, but other storage device such as a flash memory device may be used. The disk device 211 is coupled to the control device 201 via a communication line 210 such as a fibre channel cable. It should be noted that a plurality of disk devices 211 may be configured into a redundant array of independent disks (RAID).

A description will now be given of a configuration of the control device 201.

The control device 201 controls read/write of data from/to the disk device 211 according to a command received from the host 104.

The control device 201 includes a non-volatile memory 220, a central processing unit (CPU) 203, a main memory 204, a cache memory 205, a host interface (hereinafter, interface is abbreviated as I/F) 206, a management I/F 207, and a disk I/F 208. The non-volatile memory 220, the CPU 203, the main memory 204, the cache memory 205, the host I/F 206, the management I/F 207, and the disk I/F 208 are coupled with each other via a communication line 202 such as a bus.

The non-volatile memory 220 is a rewritable non-volatile memory. The non-volatile memory 220 is a flash memory, for example. The non-volatile memory 220 stores a usable bandwidth measurement program 221, an update data amount measurement program 222, a usable bandwidth prediction program 223, an update data amount prediction program 224, a management terminal communication control program 225, a backup period calculation program 226, a differential copy execution LU selection program 227, a remote copy program 228, a usable bandwidth history table 229, an update data amount history table 230, a predicted usable bandwidth table 231, a predicted update data amount table 232, and an LU table 233.

The usable bandwidth measurement program 221, the update data amount measurement program 222, the usable bandwidth prediction program 223, the update data amount prediction program 224, the management terminal communication control program 225, the backup period calculation program 226, the differential copy execution LU selection program 227, and the remote copy program 228 are transferred from the non-volatile memory 220 to the main memory 204, and are executed by the CPU 203.

The usable bandwidth measurement program 221 is executed by the CPU 203 to periodically measure the usable bandwidth of the WAN 111, and records the measurement results in the usable bandwidth history table 229. A measurement interval of the usable bandwidth of the WAN 111 is 30 minutes according to the embodiment of this invention.

The update data amount measurement program 222 is executed by the CPU 203 to periodically measure an update data amount, and records the measurement results in the update data amount history table 230.

The usable bandwidth prediction program 223 is executed by the CPU 203 to predict usable bandwidths for respective time zones having a predetermined length based on the measurement results recorded as a result of the execution of the usable bandwidth measurement program 221, and to record the predicted results in the predicted usable bandwidth table 231. The predetermined length of the time zones for which the usable bandwidth is predicted is 30 minutes according to the embodiment of this invention.

The update data amount prediction program 224 is executed by the CPU 203 to predict update data amounts for respective time zones having a predetermined length based on the measurement results recorded as a result of the execution of the update data amount measurement program 222, and to record the predicted results in the predicted update data amount table 232. The predetermined length of the time zones is 30 minutes according to the embodiment of this invention.

The management terminal communication control program 225 is executed by the CPU 203 to control communication carried out with the management terminal 103 via the management network 112.

The backup period calculation program 226 is executed by the CPU 203 to read out necessary data from the predicted usable bandwidth table 231, the predicted update data amount table 232, and the LU table 233, and calculates a period required for an initial copy and a differential copy.

The differential copy execution LU selection program 227 is executed by the CPU 203 to select an LU subject to the execution of the differential copy.

The remote copy program 228 is executed by the CPU 203 to copy data stored in the local storage system 101 to the remote storage system 102.

The usable bandwidth history table 229 records history of the usable bandwidth of the WAN 111 for the respective time zones. The usable bandwidth history table 229 will be described in detail later with reference to FIG. 4A.

The update data amount history table 230 records history of the update data amount for the respective time zones. The update data amount history table 230 will be described in detail later with reference to FIG. 4B.

The predicted usable bandwidth table 231 records predicted usable bandwidths for the respective time zones. The predicted usable bandwidth history table 231 will be described in detail later with reference to FIG. 4C.

The predicted update data amount table 232 records predicted update data amounts for the respective time zones. The predicted update data amount table 232 will be described in detail later with reference to FIG. 5A.

The LU table 233 records information input on a logical unit number (LUN)/RPO input screen 1100 described later, and also records data sizes which can be stored in the respective LUN's. The LU table 233 will be described in detail later with reference to FIG. 5B.

The main memory 204 stores the programs (221 to 227) stored in the non-volatile memory 220 if necessary. When the CPU 203 executes the programs (221 to 227) stored in the main memory 204, a usable bandwidth measurement process, an update data amount measurement process, a usable bandwidth prediction process, an update data amount prediction process, a management terminal communication control process, a backup period calculation process, and a differential copy execution LU selection process are executed.

The cache memory 205 temporarily stores data received from the host 104 and data read out from the disk device 211.

The host I/F 206 is coupled to the host 104 via the communication line 114 and the SAN 113.

The management I/F 207 is coupled to the management terminal 103 via the communication line 115 and the management network 112.

The disk I/F 208 transmits/receives data to/from the disk devices 211. The disk I/F 208 is coupled to the respective disk devices 211 via the communication line 210.

A brief description will now be given of a basic operation of the local storage system 101.

If the control device 201 receives a write command from the host 104, the control device 201 stores write data received from the host 104 in the cache memory 205. The control device 201 writes the write data stored in the cache memory 205 to the disk device 211 via the disk I/F 208. The control device 201 may notify the host 104 that the write command has been processed when the write data is stored in the cache memory 205 or when the write data is written to the disk device 211.

If the control device 201 receives a read command from the host 104, the control device 201 determines whether data requested by the host 104 is stored in the cache memory 205. If the data requested by the host 104 is stored in the cache memory 205, the control device 201 reads the data from the cache memory 205, and transmits the data to the host 104 via the host I/F 206. If the data requested by the host 104 is not stored in the cache memory 205, the control device 201 reads the requested data from the disk device 211 via the disk I/F 208, and transfers the data to the cache memory 205. Then, the control device 201 transmits data stored in the cache memory 205 to the host 104 via the host I/F 206.

Figure 3:
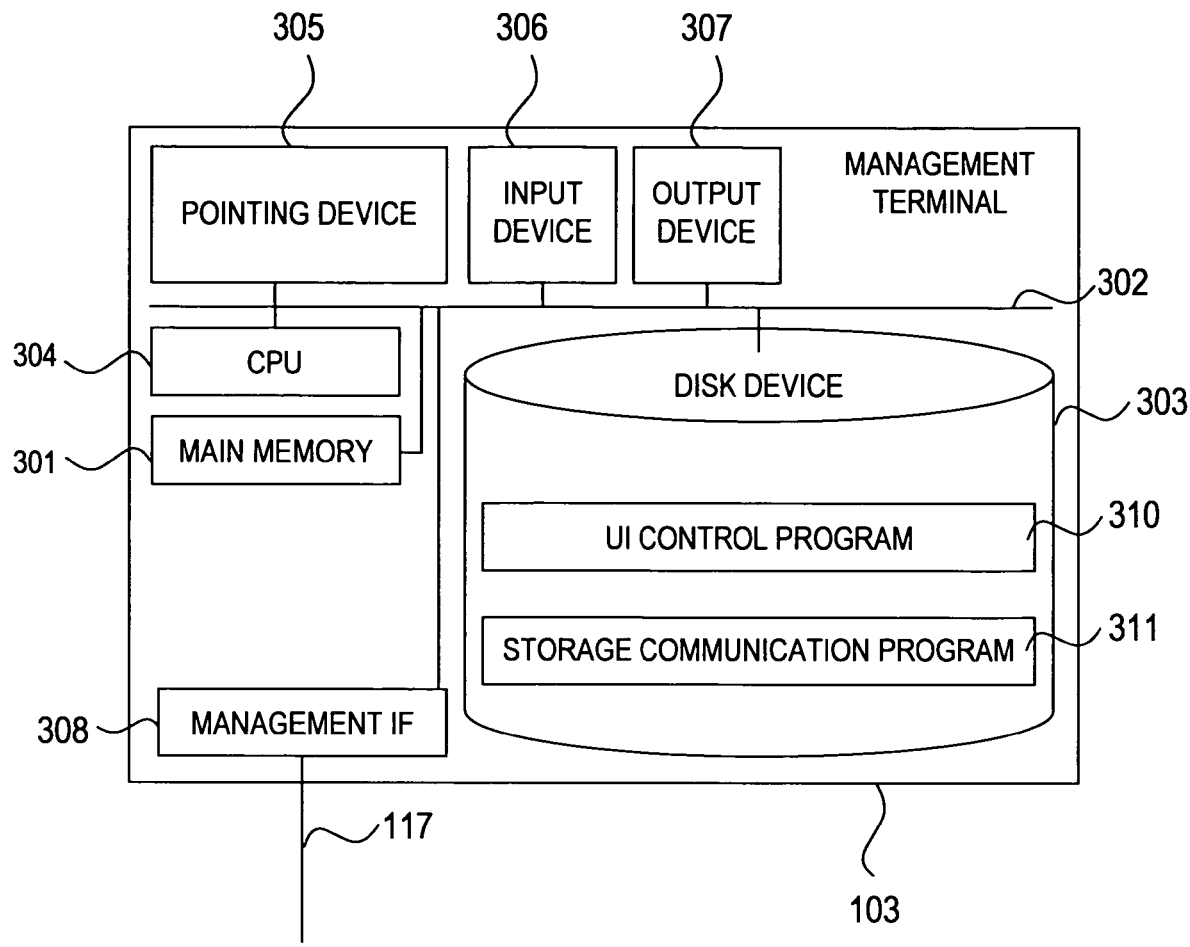
FIG. 3 is a block diagram showing a configuration of a management terminal in accordance with the embodiment of this invention.

FIG. 3 is a block diagram showing a configuration of the management terminal 103 according to the embodiment of this invention.

The management terminal 103 includes a main memory 301, a bus 302, a disk device 303, a CPU 304, a pointing device 305, an input device 306, an output device 307, and a management I/F 308. The main memory 301, the disk device 303, the CPU 304, the pointing device 305, the input device 306, the output device 307, and the management I/F 308 are coupled with each other via the bus 302.

The disk device 303 records a UI control program 310 and a storage communication program 311.

When the UI control program 310 or the storage communication program 311 is to be executed, the UI control program 310 or the storage communication program 311 stored in the disk device 303 is transferred to the main memory 301 respectively. The CPU 304 carries out a UI control process and a storage communication process by executing the programs stored in the main memory 301.

The UI control program 310 is executed by the CPU 304 to display screens such as an LUN/backup start time input screen 610, an initial copy/maximum differential copy period display screen 620, and the LUN/RPO input screen 1100 on the output device 307. Moreover, the UI control program 310 is executed by the CPU 304 to store information, which is input by the administrator via the pointing device 305 or the input device 306, in the main memory 301.

The storage communication program 311 is executed by the CPU 304 to communicate with the local storage system 101 via the management network 112. For example, the storage communication program 311 transmits information, which is input by the administrator as a result of the execution of the UI control program 310, to the local storage system 101 if necessary.

Configurations of the host 104 and the remote storage system 102 are the same as conventional host computer and storage system, respectively.

A description will now be given of the respective tables stored in the non-volatile memory 220 of the local storage system 101 with referent to FIGS. 4A and 5B.

FIG. 4A is a diagram showing a configuration of the usable bandwidth history table 229 according to the embodiment of this invention.

The usable bandwidth history table 229 includes times 411 and usable bandwidths 412.

The time 411 is a time point at which the local storage system 101 starts the measurement of the usable bandwidth. The usable bandwidth 412 is the bandwidth measured by the local storage system 101. For example, a record 413 of FIG. 4A indicates that the usable bandwidth measured by the local storage system 101 starting from "2007/07/01 20:30" is "8 Mbps."

The usable bandwidth history table 229 is updated by the execution of the usable bandwidth measurement process. A description will now be given of the usable bandwidth measurement process.

The CPU 203 executes the usable bandwidth measurement program 221 to measure the usable bandwidth of the WAN 111 periodically (at the interval of 30 minutes according to the embodiment of this invention). The CPU 203 newly creates a record including a time point at which the measurement is started as a time 411, and a measurement result as a usable bandwidth 412, and adds the created record to the usable bandwidth history table 229. If the number of the records stored in the usable bandwidth history table 229 reaches a predetermined upper limit, the CPU 203 deletes unnecessary records.

FIG. 4B is a diagram showing a configuration of the update data amount history table 230 according to the embodiment of this invention.

The update data amount history table 230 includes times 421, LUN 422, and update data amount 423.

The time 421 is a time point at which the local storage system 101 starts the measurement of the update data amount. The LUN 422 is an identifier of an LU which stores updated data. The update data amount 423 is an update data amount measured by the local storage system 101. For example, a record 424 of FIG. 4B indicates that the local storage system 101 started measuring the update data amount of an LU whose LU is "2" from "2007/07/01/20:30," and the measured update data amount is "2.5 GB."

The update data amount history table 230 is updated by the execution of the update data measurement process. A description will now be given of the update data amount measurement process.

The CPU 203 executes the update data amount measurement program 222 to periodically (every 30 minutes, for example) measure the update data amount for respective LU's for a predetermined period (one minute, for example), and calculates an update data amount for 30 minutes based on the measured result. The CPU 203 newly creates a record including a time 421 containing the time point at which the measurement started, an LUN 422 containing the LUN of the LU subject to the measurement, and an update data amount 423 containing the calculated result, and adds this record to the update data amount table 230.

If the number of rows of the update data amount history table 230 reaches a predetermined upper limit, the CPU 203 deletes unnecessary records. Moreover, the CPU 203 may execute the update data amount measurement program 222 to always measure the update data amount for the respective LU's, and may update the update data amount history table 230 periodically (every 30 minutes, for example).

FIG. 4C is a diagram showing a configuration of the predicted usable bandwidth table 231 according to the embodiment of this invention.

The predicted usable bandwidth table 231 includes times 431 and predicted usable band widths 432.

The predicted usable bandwidth 432 stores a usable bandwidth at a time point indicated by a time 431 predicted by the local storage system 101. For example, a record 433 of FIG. 4C indicates that a predicted usable bandwidth at "2007/07/08/20:30" is "8 Mbps." Moreover, in the predicted usable bandwidth table 231, the records are sorted by the value of the time 431 in the chronological order.

The predicted usable bandwidth table 231 is updated by the execution of the usable bandwidth prediction process. A description will now be given of the usable bandwidth prediction process.

The CPU 203 executes the usable bandwidth measurement program 223 to complete the usable bandwidth measurement process, and then reads out usable band widths measured at the same time point on the same day of the week as those for which the usable bandwidth was measured in a certain period (last one month, for example) from the usable bandwidth history table 229. Then, the CPU 203 calculates the average of the read usable bandwidths, and sets the calculated value as a predicted usable bandwidth in the future (one week later, for example). Then, the CPU 203 newly creates a record containing a future time point at which the prediction is carried out as a time 431, and the calculated predicted usable bandwidth as a predicted usable bandwidth 432, and adds this record to the predicted usable bandwidth table 231. If the number of the records stored in the predicted usable bandwidth history table 231 reaches a predetermined upper limit, the CPU 203 deletes records whose value of the time 431 is older than the present time, and the like.

FIG. 5A is a diagram showing a configuration of the predicted update data amount table 232 according to the embodiment of this invention.

The predicted update data amount history table 232 includes times 511, LUN's 512, and predicted update data amounts 513.

The predicted update data amount 513 is predicted by the local storage system 101, and contains an update data amount of an LU specified by an LUN 512 at a time point specified by a time 511. For example, a record 514 of FIG. 5A indicates that a predicted update data amount of an LU whose LUN is 2 at "2007/07/08/21:00" is "2.5 GB." Moreover, in the predicted update data amount table 232, the records are sorted by the value of the time 511 in the chronological order.

The predicted update data amount table 232 is updated by the execution of the update data amount prediction process. A description will now be given of the update data amount prediction process.

The CPU 203 executes the update data amount prediction program 224 to complete the update data amount prediction process, and then reads out update data amounts measured at the same time point on the same day of the week as those for which the update data amount was measured in a certain period (last one month, for example) from the update data amount history table 230. Then, the CPU 203 calculates the average of the read update data amounts, and sets the calculated value as a predicted update data amount in the future (one week later, for example). Then, the CPU 203 newly creates a record containing a future time point at which the prediction is carried out as a time 511, the LUN of the LU subject to the prediction as an LUN 512, and the calculated predicted update data amount as a predicted update data amount 513, and adds this record to the predicted update data amount table 232. If the number of the records stored in the predicted update data amount table 232 reaches a predetermined upper limit, the CPU 203 deletes records whose value of the time 511 is older than the present time, and the like.

FIG. 5B is a table showing a configuration of the LU table 233 according to the embodiment of this invention.

The LU table 233 includes LUN's 521, LU sizes 522, and RPO's 523.

The LUN 521 is an identifier of an LU. The LU size 522 is a size of data the LU can store. The RPO 523 is an index indicating up to which time point data is to be recovered from a time point at which an accident or a failure occurs.

Contents of the LU table 233 are updated as follows. First, the CPU 304 of the management terminal 103 executes the UI control program 310 to display a screen for receiving inputs of an LUN and an LU size from the administrator. After the administrator inputs the LUN and LU size on this screen, the CPU 304 of the management terminal 103 executes the storage communication program 311 to transmit the input LUN and LU size to the local storage system 101.

Then, the CPU 203 of the local storage system 101 executes the management terminal communication control program 225 to receive the LUN and LU size transmitted from the management terminal 103. A new record containing the received LUN and LU size as an LUN 521 and an LU size 522, respectively, and a value "Not Assigned" as the value of a RPO 523 is added to the LU table 233.

The local storage system 101 and the management terminal 103 use the programs and tables described above to receive inputs of the LUN of an LU to be backed up and a time point for starting the backup from the administrator, calculate an initial copy period and a maximum differential copy period of the LU, and display those time periods on the output device 307. The administrator can recognize the initial copy period and the maximum differential copy period of the LU to be backed up, and thus can determine a timing at which a backup of the LU can be created in the remote storage device 102 earliest before the backup starts via the WAN 111 whose bandwidth fluctuates. Moreover, the administrator compares RPO and the maximum differential copy period determined for each LU to determine whether the RPO can be satisfied.

Moreover, if there are a plurality of LU's to be backed up, the local storage system 101 prioritizes the differential copy of LU's with strict RPO's (namely, high RPO's) using the programs and tables described above. With this configuration, even if the bandwidth of the WAN 111 fluctuates, the local storage system 101 can back up stored data so as to satisfy the RPO requirement.

A description will now be given of a process carried out by the local storage system 101 and the management terminal 103 for calculating the initial copy period and the maximum differential copy period and showing them to the administrator. First, with reference to FIGS. 6A and 6B, a description will given of an LUN/backup start time input screen 610 and an initial copy/maximum differential copy period display screen 620.

Figure 6A:
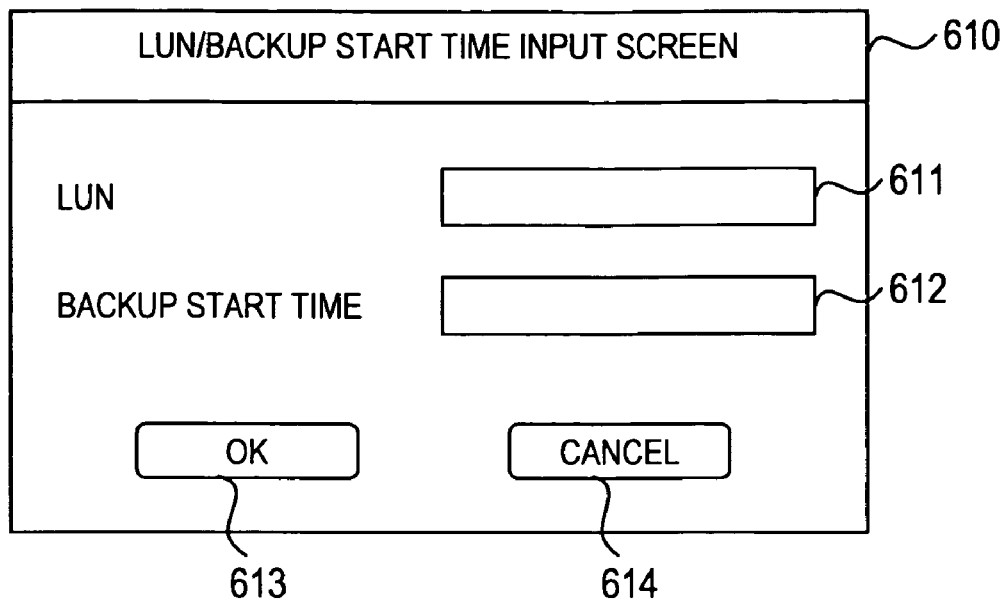
FIG. 6A is a diagram showing a LUN/backup start time input screen in accordance with the embodiment of this invention.

FIG. 6A shows the LUN/backup start time input screen 610 according to the embodiment of this invention.

The LUN/backup start time input screen 610 is displayed on the output device 307 of the management terminal 103. The LUN/backup start time input screen 610 includes an LUN input section 611, a backup start time input section 612, a button 613, and a button 614.

The LUN input section 611 receives an input of an LUN to be backed up from the administrator. The backup start time input section 612 receives an input of a time for starting the backup from the administrator.

When the button 613 is operated by the administrator, information input on the LUN/backup start time input screen 610 is fixed, and the input information is transmitted to the local storage system 101. When the button 614 is operated by the administrator, inputs on the LUN/backup start time input screen 610 are canceled.

When the button 613 is operated by the administrator, the CPU 304 of the management terminal 103 executes the storage communication program 311 to transmit the LUN and the backup start time input by the administrator to the local storage system 101. The CPU 203 of the local storage system 101 executes the management terminal communication control program 225 to receive the LUN and the backup start time transmitted from the management terminal 103, and then executes the backup period calculation process. Steps of the backup period calculation process will be described with reference to FIGS. 7 and 8.

Figure 6B:
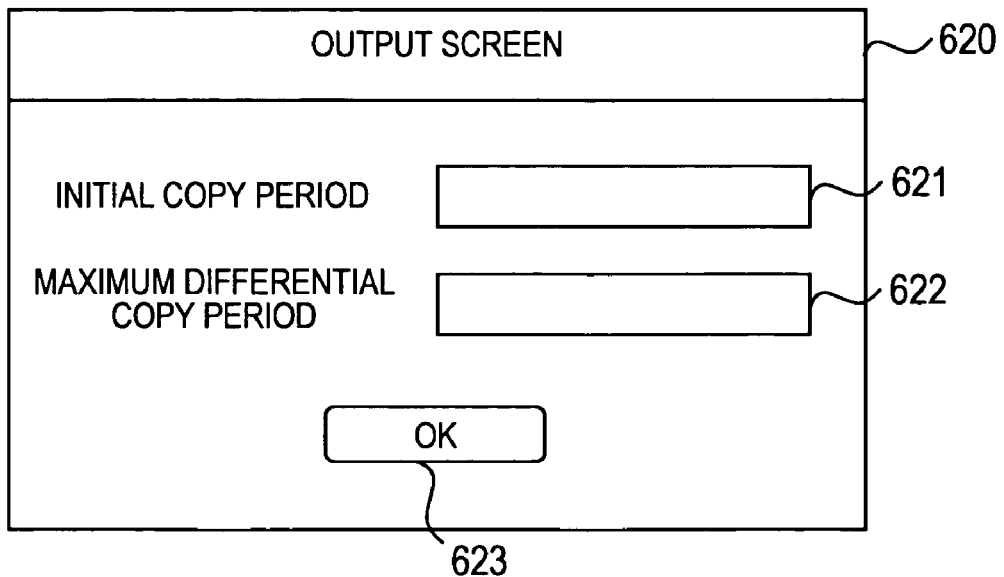
FIG. 6B is a diagram showing an initial copy/maximum differential copy period display screen in accordance with the embodiment of this invention.

FIG. 6B shows an initial copy/maximum differential copy period display screen 620 according to the embodiment of this invention.

The initial copy/maximum differential copy period display screen 620 is displayed on the output device 307 of the management terminal 103. The initial copy/maximum differential copy period display screen 620 includes an initial copy period output section 621, a maximum differential copy period output section 622, and a button 623.

The initial copy period output section 621 outputs the initial copy period calculated by the local storage system 101. The maximum differential copy period output section 622 outputs the maximum differential copy period calculated by the local storage system 101. The button 623 is operated to finish the display of this screen after the administrator confirms the initial copy period and the maximum differential copy period.

After the backup period calculation process is finished, the CPU 203 of the local storage system 101 executes the management terminal communication control program 225 to transmit the initial copy period and the maximum differential copy period to the management terminal 103. The CPU 304 of the management terminal 103 executes the storage communication program 311 to receive the initial copy period and the maximum differential copy period from the local storage system 101. Then, the CPU 304 executes the UI control program 310 to display the initial copy period and the maximum differential copy period on the initial copy/maximum differential copy period display screen 620.

A description will now be given of a process for calculating backup periods. The backup periods include the initial copy period and the maximum differential copy period. The initial copy period is a period required for backing up entire data stored in an LU to be backed up stored in the local storage system 101. The maximum differential copy period is a period required for backing up data updated during the initial copy as differential data. The backup period calculation process is realized by the execution of the backup period calculation program 226 by the CPU 203 of the local storage system 101.

Figure 7:
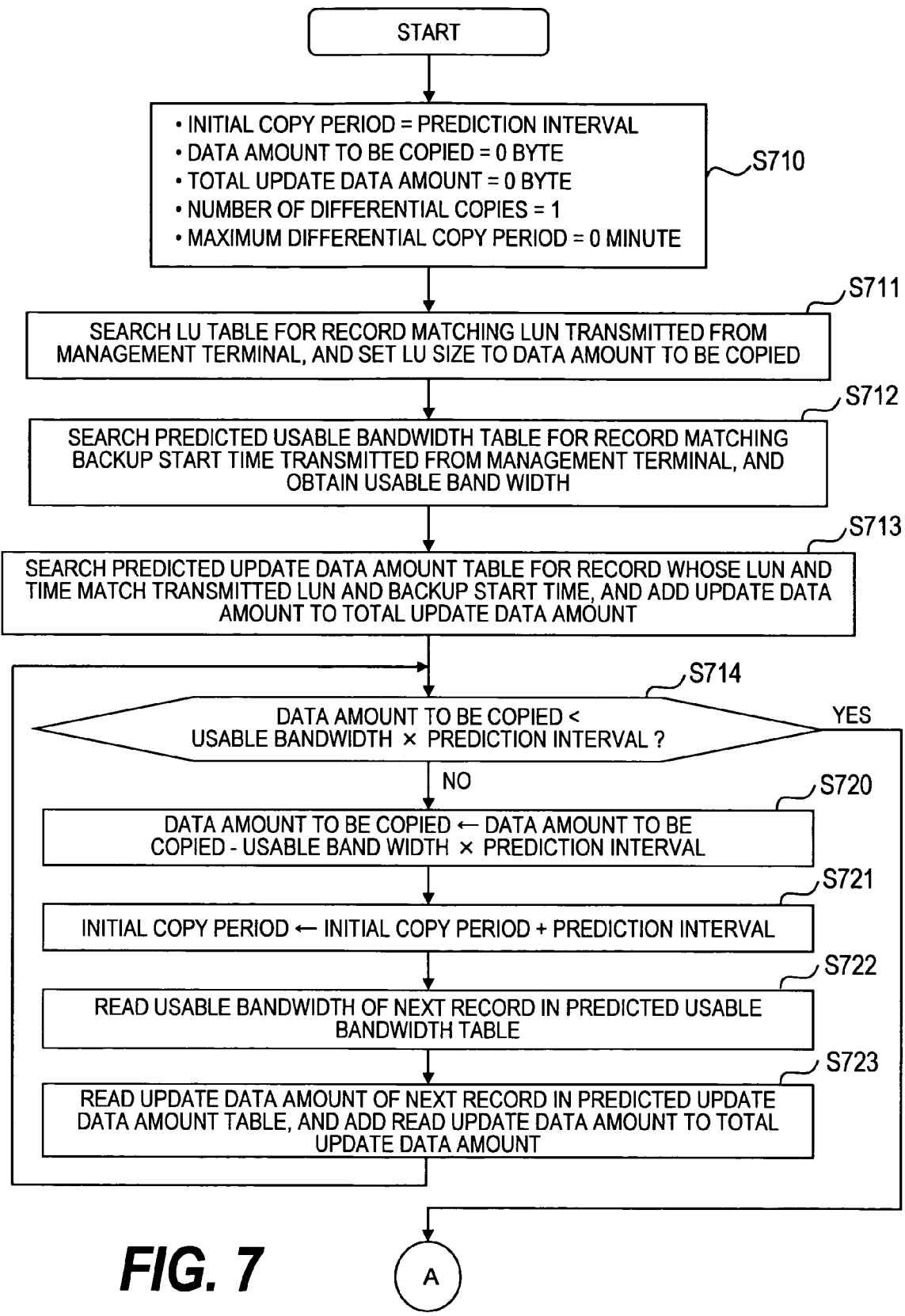
FIG. 7 is a flowchart showing process of calculating an initial copy period included in a backup period calculation process in accordance with the embodiment of this invention.
Figure 8:
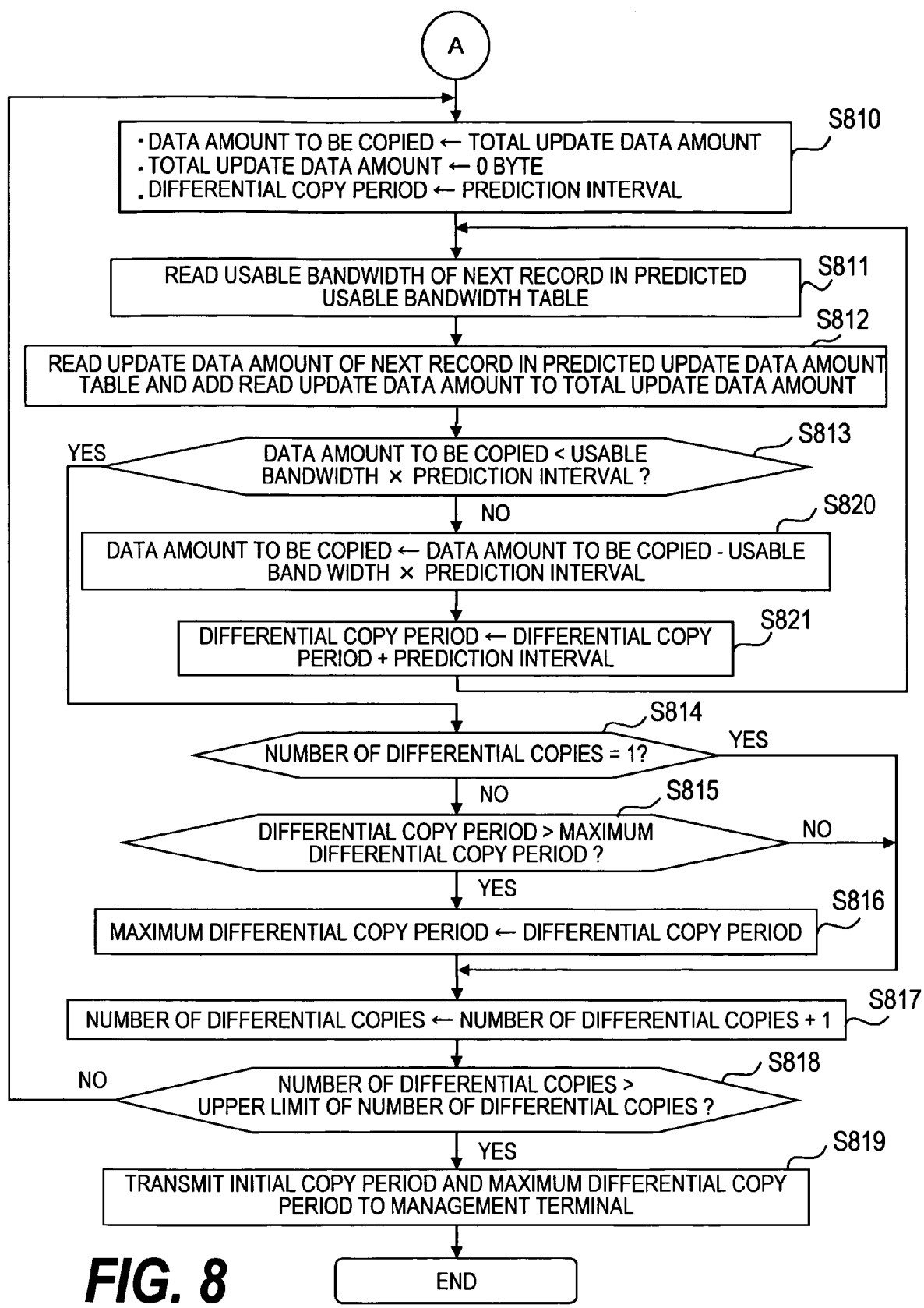
FIG. 8 is a flowchart showing process of calculating a maximum differential copy period included in the backup period calculation process in accordance with the embodiment of this invention.

FIGS. 7 and 8 are flowcharts showing steps of calculating the backup periods, and a description will now be given of the process with reference to those flowcharts. It should be noted that a step is abbreviated as "S" in the description of the respective flowcharts.

FIG. 7 is a flowchart showing process of calculating the initial copy period included in the backup period calculation process according to the embodiment of this invention.

When necessary information is input on the LUN/backup start period input screen 610 displayed in the management terminal 103, and the button 613 is operated, the input information is transmitted to the local storage system 101, and the backup period calculation process starts.

The CPU 203 of the local storage system 101 sets an update data amount prediction interval (30 minutes according to the embodiment of this invention) as an initial value of an "initial copy period." Similarly, "0" byte is set to an initial value of an "amount of data to be copied"; "0" byte, an initial value of a "total update data amount"; "1," an initial value a "number of differential copies"; and "0" minute, an initial value of a "maximum differential copy period" (S710).

The CPU 203 of the local storage system 101 searches the LU table 233 for a record whose value of the LUN 521 matches the value of the LUN input in the LUN input section 611 of the LUN/backup start time input screen 610. Then, the CPU 203 sets the value of the LU size 522 of the searched record to the "amount of data to be copied" (S711).

The CPU 203 of the local storage system 101 searches the predicted usable bandwidth table 231 for a record whose value of the time 431 matches the backup start time input in the backup start time input section 612 of the LUN/backup start time input screen 610. The CPU 203 then acquires the value of the predicted usable bandwidth 432 of the searched record (S712).

The CPU 203 of the local storage system 101 searches the predicted update data amount table 232 for a record whose value of the LUN 512 and whose value of the time 511 match the value of the LUN input to the LUN input section 611 and the value of the backup start time input to the backup start time input section 612, respectively. Then, the CPU 203 adds the value of the predicted update data amount 513 of the searched record to the value of the "total update data amount" (S713). The "total update data amount" is a data update quantity of the specified LU during the initial copy.

The CPU 203 of the local storage system 101 determines whether the value of the "data amount to be copied" is larger than a product of the value of the predicted usable bandwidth 432 and the prediction interval read in the step S712 and a step S722 (S714). The product of the value of the predicted usable bandwidth 432 and the prediction interval corresponds to a data amount which can be backed up.

If the "data amount to be copied" is not larger than the product of the value of the predicted usable bandwidth 432 and the prediction interval ("NO" in the S714), the CPU 203 of the local storage system 101 executes a process in a step S720. In the process of the step S720, the CPU 203 sets the value of the "data amount to be copied" to a value obtained by subtracting the product of the value of the predicted usable bandwidth 432 and the prediction interval from the "data amount to be copied." From the step S720 to a step S723, the CPU 203 carries out a process to extend the "initial copy period" to a next prediction interval.

The CPU 203 of the local storage system 101 sets a sum of the value of the "initial copy" and the prediction interval to the value of the "initial copy period" (S721). In other words, the CPU 203 extends the initial copy period by the prediction interval.

The CPU 203 of the local storage system 101 obtains the value of the predicted usable bandwidth 432 of the next record in the predicted usable bandwidth table 231 (S722). In other words, the CPU 203 obtains the value of the predicted usable bandwidth 432 in the extended initial copy period.

The CPU 203 of the local storage system 101 reads out the value of the predicted update data amount 513 of the next record in the predicted update data amount table 232, and adds the read value of the predicted update data amount 513 to the "total update data amount" (S723). In other words, the CPU 203 obtains the value of the predicted update data amount 513 in the extended initial copy period, and adds the read value to the "total update data amount."

After the CPU 203 has completed the processes from the step S720 to the step S723, the CPU 203 again carries out the process of the step S714. The data amount which has been copied until immediately before the step S720 is subtracted by the process in the step S720, and thus the value of the "data amount to be copied" is the data amount to be copied in the extended prediction interval. Thus, by comparing with a product of the value of the usable bandwidth and the prediction interval, it is possible to determine whether the entire data to be copied can be copied in the extended period.

On the other hand, if the "data amount to be copied" is larger than the product of the value of the predicted usable bandwidth 432 and the prediction interval ("YES" in the step S714), the calculation of the initial copy period has been completed, and thus, the CPU 203 of the local storage system 101 carries out a process for calculating the maximum differential copy period. With reference to FIG. 8, a description will now be given of the process for calculating the maximum differential copy period.

FIG. 8 is a flowchart showing process of calculating the maximum differential copy period included in the backup period calculation process according to the embodiment of this invention.

After the CPU 203 of the local storage system 101 has calculated the initial copy period, the CPU 203 sets the "total update data amount" to the "data amount to be copied," 0 byte to an initial value of the "update data amount," and a copy cycle period to an initial value of the "differential copy period" (S810). The copy cycle period is an interval between the differential copies carried out by the local storage system 101. According to the embodiment of this invention, the copy cycle period is 30 minutes, which is the same as the prediction interval.

When the process of the step S810 is being executed, records when the initial copy has been completed are referred to in the predicted usable bandwidth table 231 and the predicted update data amount table 232.

The CPU 203 of the local storage system 101 obtains the value of the predicted usable bandwidth 432 of the next record in the predicted usable bandwidth table 231 (S811).

Then, the CPU 203 of the local storage system 101 reads out the value of the predicted update data amount 513 of the next record in the predicted update data amount table 232, and adds the read value to the "total update data amount" (S812).

The CPU 203 of the local storage system 101 determines whether the "data amount to be copied" is larger than the product of the value of the predicted usable bandwidth 432 and the prediction interval (S813).

If the "data amount to be copied" is not larger than the product of the value of the predicted usable bandwidth 432 and the prediction interval ("NO" in the step S813), the CPU 203 of the local storage system 101 sets the value obtained by subtracting the product of the read value of the predicted usable bandwidth 432 and the prediction interval from the "data amount to be copied" to the "data amount to be copied" (S820).

The CPU 203 of the local storage system 101 sets the sum of the "differential copy period" and the prediction interval to the "differential copy period" (S821). Then, when the CPU 203 has completed the processes from the step S820 and the step S821, the CPU 203 again carries out the process of the step S811.

On the other hand, if the "data amount to be copied" is larger than the product of the value of the predicted usable bandwidth 432 and the prediction interval ("YES" in the step S813), the CPU 203 of the local storage system 101 determines whether the "number of differential copies" is one (S814). In other words, the CPU 203 determines whether the differential copy is completed in the prediction interval immediately after the completion of the initial copy.

If the "number of the differential copies" is one ("YES" in the step S814), the CPU 203 of the local storage system 101 adds one to the "number of differential copies" (S817).

On the other hand, if the "number of differential copies" is not one ("NO" in the step S814), the CPU 203 of the local storage system 101 determines whether the "differential copy period" is longer than the "maximum differential copy period" (S815).

If the "differential copy period" is not longer than the "maximum differential copy period" ("NO" in the step S815), the CPU 203 of the local storage system 101 adds one to the "number of differential copies" (S817).

On the other hand, if the "differential copy period" is longer than the "maximum differential copy period" ("YES" in the step S815), the CPU 203 of the local storage system 101 sets the value of the "differential copy period" to the "maximum differential copy period" (S816). Further, the CPU 203 of the local storage system 101 adds one to the "number of differential copies" (S817).

The initial copy period, in which the entire data is copied, is longer than the differential copy period, and thus a period required for the first differential copy, which copies data updated during the initial copy period, is the maximum differential copy period in most cases. Thus, according to the embodiment of this invention, it is assumed that the differential copy is carried out at least twice, the first differential copy is excluded from the differential copies for calculating the maximum differential copy period, and the maximum differential copy period is calculated in consideration of the second and subsequent differential copies, which are subject to the fluctuation of the usable bandwidth.

Further, the CPU 203 of the local storage system 101 determines whether the "number of differential copies" is larger than a predetermined upper limit of the number of the differential copies (S818).

If the "number of differential copies" is not larger than the upper limit ("NO" in the step S818), the CPU 203 of the local storage system 101 carries out a process of the step S810.

On the other hand, if the "number of differential copies" is larger than the "upper limit" ("YES" in the step S818), as described with reference to FIG. 6B, the CPU 203 of the local storage system 101 executes the management terminal communication control program 225, and transmits the "initial copy period" and the "maximum differential copy period" to the management terminal 103.

The CPU 304 of the management terminal 103 executes the storage communication program 311 to receive the "initial copy period" and the "maximum differential copy period." Lastly, the CPU 304 of the management terminal 103 executes the UI control program 310 to display the initial copy/maximum differential copy period display screen 620, and displays the "initial copy period" in the initial copy period output section 621, and the "maximum differential copy period" in the maximum differential copy period output section 622 (S819).

The description is given of the case in which the initial copy is executed and then, the differential copy is executed according to the embodiment of this invention, but only the differential copies may be carried out after the initial copy is once carried out. In this case, a process for calculating only the maximum differential copy period may be provided. Specifically, an initialization process may be added to the steps shown in FIG. 8.

Then, with reference to FIGS. 9A to 12, a description will now be given of a process carried out by the local storage system 101 for carrying out the differential copies of the LU's based on RPO's.

Figure 9A:
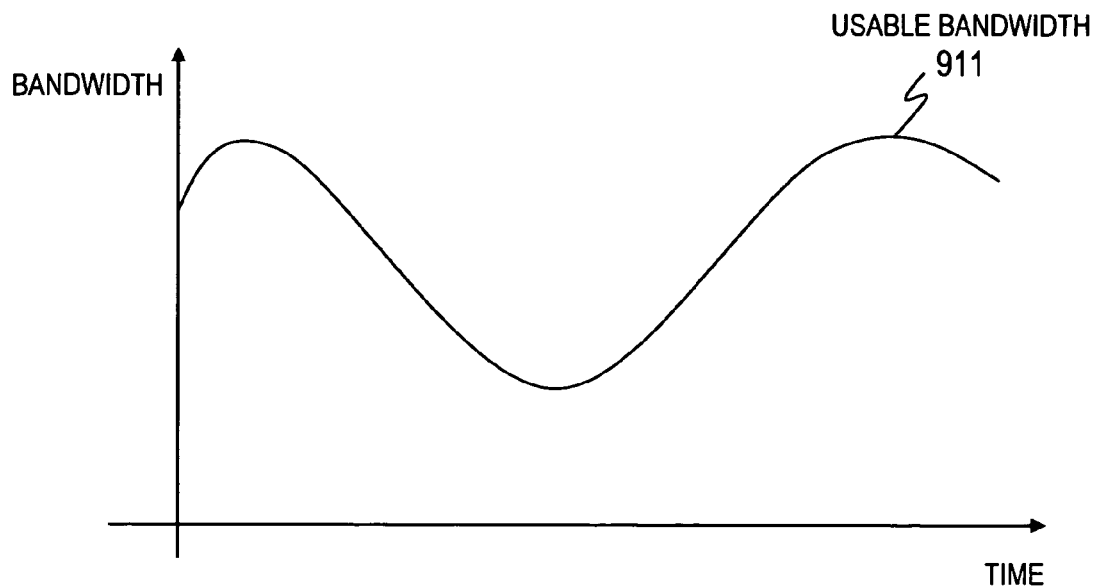
FIG. 9A is a diagram showing an example of changes in a usable bandwidth of a WAN in accordance with the embodiment of this invention.

FIG. 9A shows an example of changes in the usable bandwidth 911 of the WAN 111 according to time zones according to the embodiment of this invention.

Figure 9B:
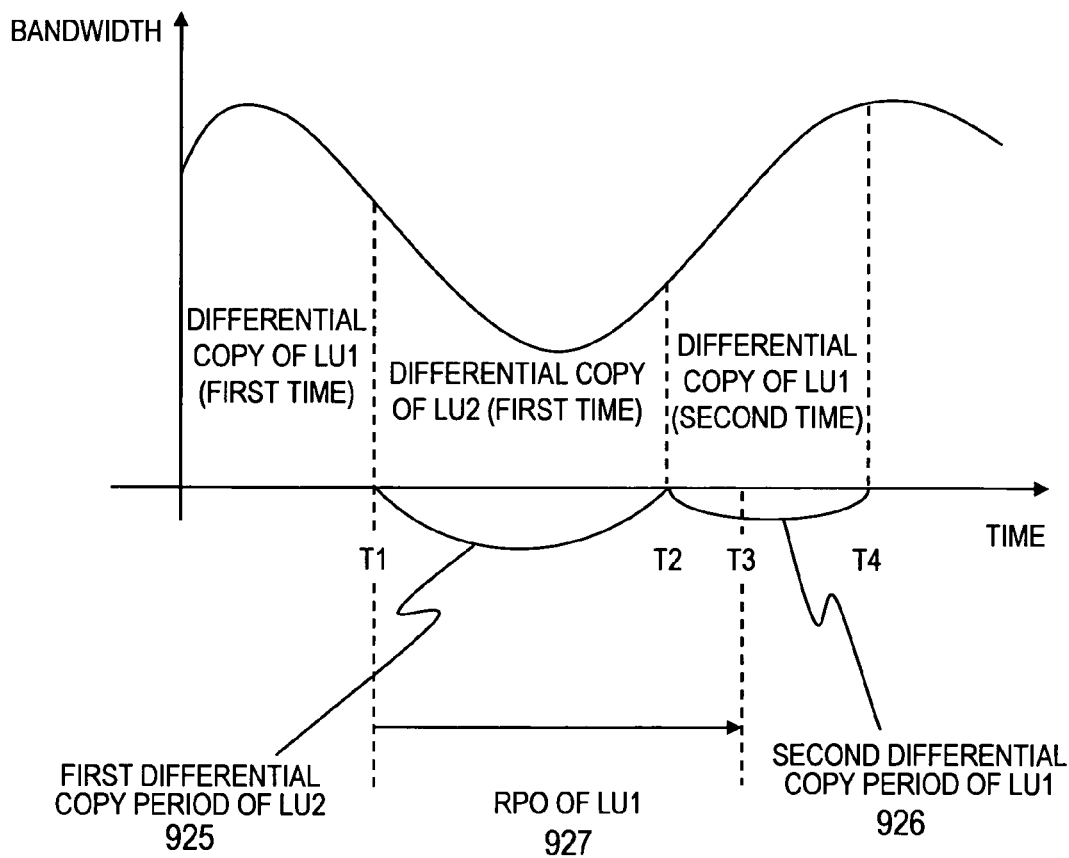
FIG. 9B is a diagram showing an example of a case in which backups are created by execution of differential copies without considering a variation of a usable bandwidth in accordance with the embodiment of this invention.

As shown in FIG. 9A, on an inexpensive WAN, which can be a subject of the embodiment of this invention, because the usable bandwidth 911 changes according to the time zone, the data amount which can be transferred varies according to the time zone. As a result, for efficiently creating backups, it is necessary to understand the data amount which can be backed up for the respective time zones in advance. Moreover, the backup needs to be scheduled to satisfy the RPO's. Referring to FIG. 9B, a description will now be given of a case in which backups are created by the differential copies without considering the usable bandwidth varying according to the time zone. Then, referring to FIG. 10, a description will be given of how to create backups while the change in the usable bandwidth according to the time zone is considered, and the RPO's are satisfied.

FIG. 9B describes an example of a case in which backups are created by execution of differential copies without considering the variation of the usable bandwidth according to the embodiment of this invention.

When the backups are created without considering the variation of the usable bandwidth, a possible method is to calculate a period required for a backup based on a theoretical value or an average of the usable bandwidth. When the backups are created without considering the variation of the usable bandwidth, a first differential copy of an LU1 is carried out, and then, a first differential copy of an LU2 is carried out. Then, a second differential copy of the LU1 is carried out. The respective differential copies are completed at times T1, T2, and T4. It should be noted that the RPO's of the LU1 and LU2 are one hour and one day, respectively.

The second differential copy of the LU1 should be finished before the period of the RPO (927) of the LU1 elapses (T3) after the first differential copy of the LU1 is completed. In other words, a condition T3>T4 should be met.

However, as shown in FIG. 9B, because a time zone in which the differential copy of the LU2 is carried out has a narrow usable bandwidth, if the differential copy period 925 is calculated based on the average of the usable bandwidth or the like, the actual differential copy period is longer than the calculated required period. As a result, if the second differential copy of the LU1 is carried out after the differential copy of the LU2 is finished, as shown in FIG. 9B, the interval between the completion of the first differential copy of the LU1 and the completion of the second differential copy of the LU1 is longer than the RPO of the data stored in the LU1. In this case, the RPO requirement cannot be met.

Figure 10:
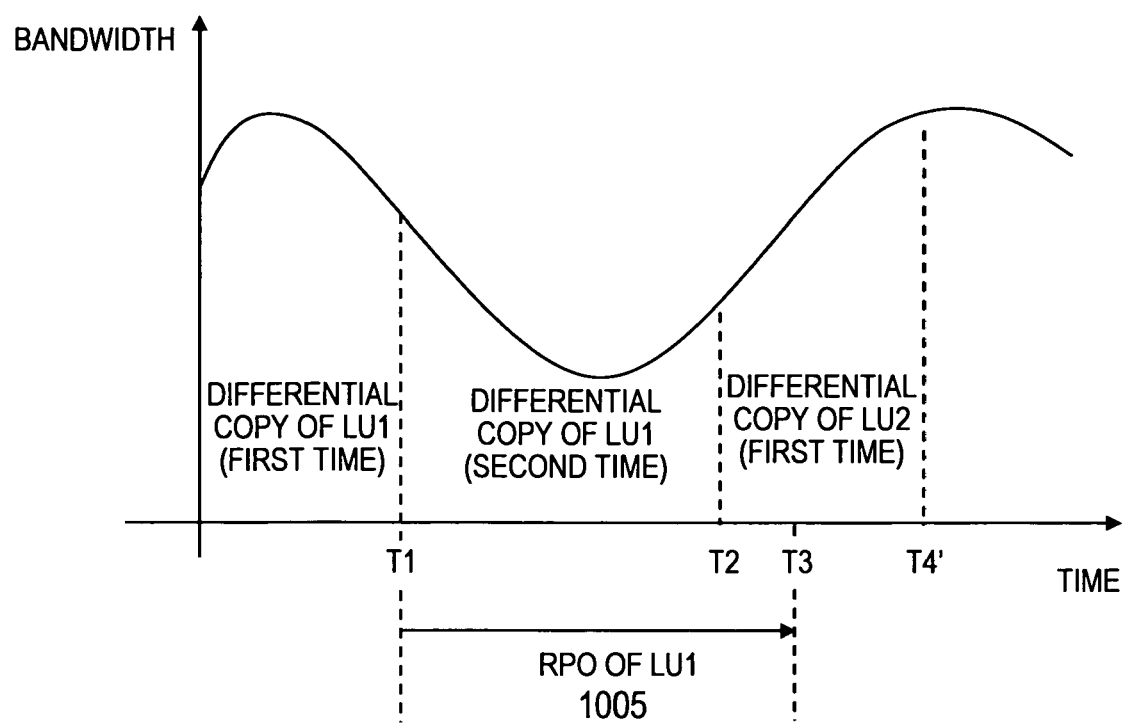
FIG. 10 is a diagram showing a process for creating backups by execution of differential copies, considering a variation of a usable bandwidth in accordance with the embodiment of this invention.

FIG. 10 describes a process for creating backups by execution of differential copies, considering the variation of the usable bandwidth according to the embodiment of this invention.

The usable bandwidth of the WAN 111 changes as the usable bandwidth 911 shown in FIG. 9A. It should be noted that the RPO's of the LU1 and LU2 are one hour and one day as described before, respectively.

First, the local storage system 101 executes the differential copy execution LU selection program 227 to predict periods of the first differential copies of the LU1 and LU2 and a period of the second differential copy of the LU1 whose RPO is high, before the first differential copies of the LU1 and LU2 are executed. Then, the local storage system 101 compares a period obtained by adding the second differential copy period of the LU1 to the first differential copy period of the LU2 (T2 of FIG. 9B) and the RPO of the LU1, and if the sum is higher than the RPO of the LU1, as shown in FIG. 10, the local storage system 101 carries out the second differential copy of the LU1 before the first differential copy of the LU2. In this way, by determining the order of executing the differential copies, the second differential copy of the LU1 is completed at a time T2', and thus, the RPO requirement of the LU1 can be met.

Figure 11:
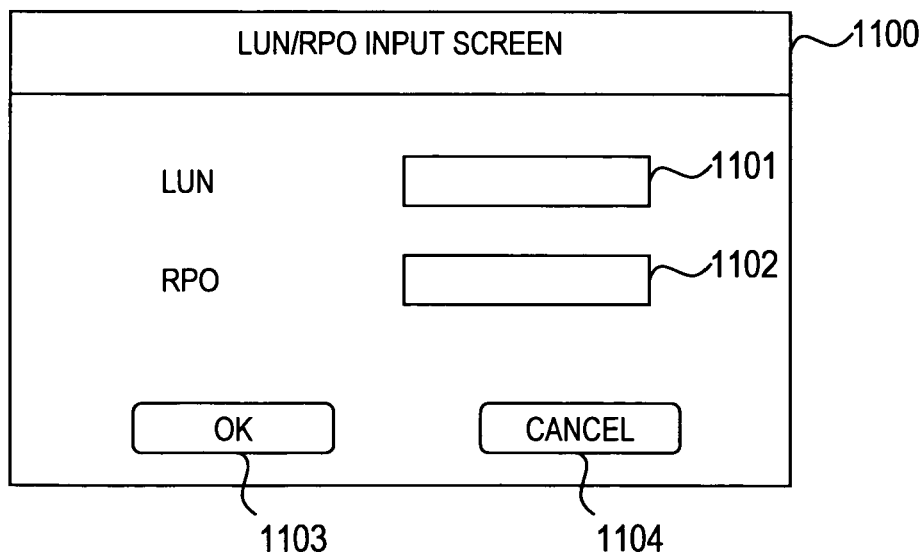
FIG. 11 is a diagram showing an example of an LUN/RPO input screen in accordance with the embodiment of this invention.

FIG. 11 shows an example of the LUN/RPO input screen 1100 according to the embodiment of this invention.

The LUN/RPO input screen 1100 is displayed on the output device 307 of the management terminal 103. The LUN/RPO input screen 1100 includes an LUN input section 1101, an RPO input section 1102, a button 1103, and a button 1104.

The LUN input section 1101 receives the LUN of an LU input by the administrator. Similarly, the RPO input section 1102 receives the RPO of the LU input by the administrator. When the button 1103 is operated by the administrator, the information input on the LUN/RPO input screen 1100 is fixed, and the input information is transmitted to the local storage system 101. When the button 1104 is operated by the administrator, inputs on the LUN/RPO input screen 1100 are canceled. It is assumed that the RPO of an LU is longer than at least the copy cycle period according to the embodiment of this invention.

When the button 1103 is operated by the administrator, the CPU 304 of the management terminal 103 executes the storage communication program 311 to transmit the LUN and the RPO input by the administrator to the local storage system 101. The CPU 203 of the local storage system 101 executes the management terminal communication control program 225 to receive the LUN and the RPO transmitted from the management terminal 103, then searches the LU table 233 for a record with a value of the LUN 521 matching the received LUN, and writes the RPO in the RPO 523 of the searched record.

Figure 12:
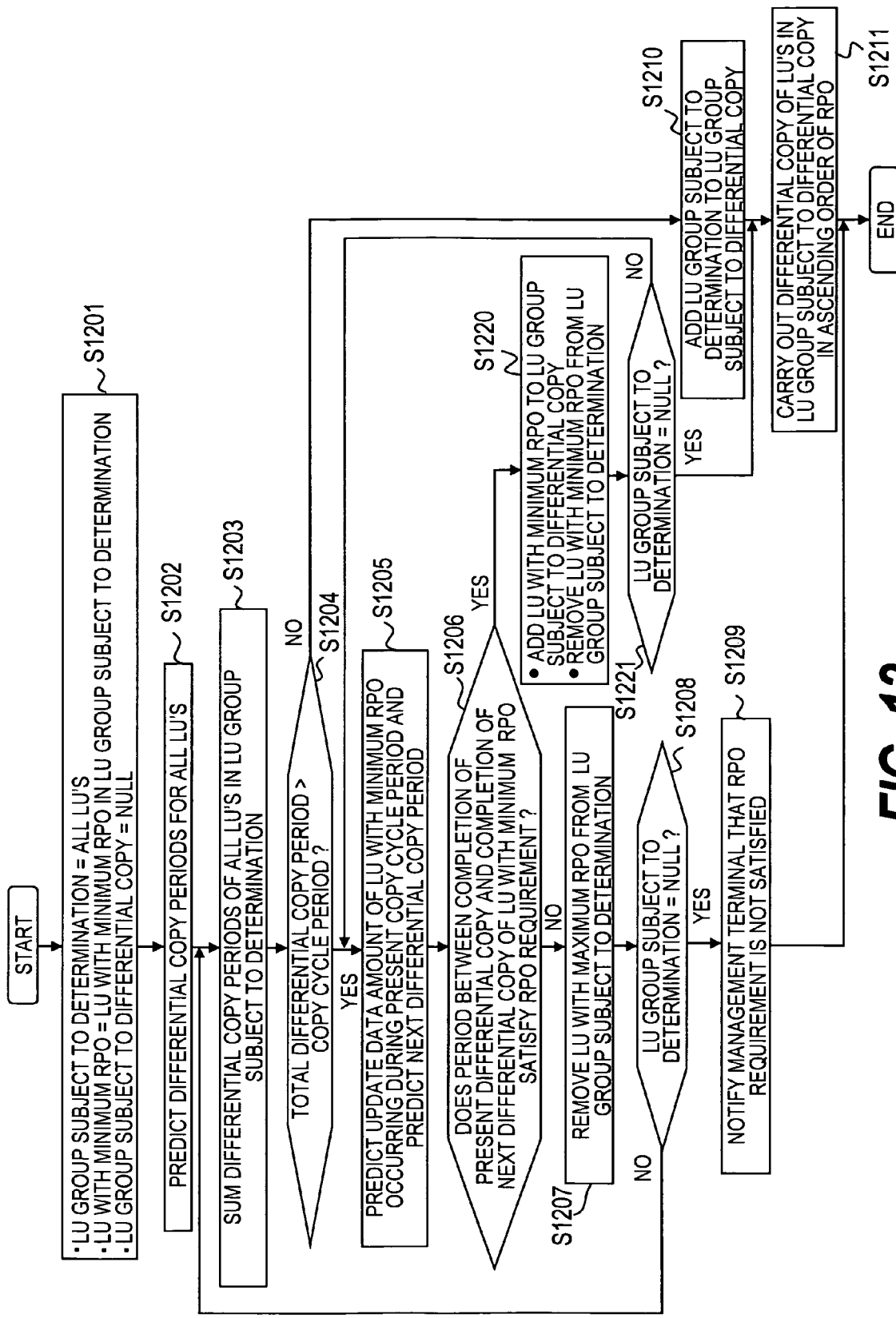
FIG. 12 is a flowchart showing process of a process for selecting an LU for which a differential copy is executed while considering a RPO in accordance with the embodiment of this invention.

FIG. 12 is a flowchart showing process of the process for selecting an LU for which the differential copy is executed while considering the RPO according to the embodiment of this invention.

This process is carried out by the differential copy execution LU selection program 227 executed by the CPU 203 of the local storage system 101.

The CPU 203 of the local storage system 101 initially sets all LU's subject to the differential copy to an "LU group subject to determination." Moreover, an LU with the highest RPO of the LU's in the "LU group subject to determination" is set to an "LU with minimum RPO." Further, an "LU group subject to differential copy" is set to null (S1201).

The "LU group subject to determination" is a group of LU's for which the local storage system 101 determines whether the RPO requirement is met. Moreover, the "LU group subject to differential copy" is a group of LU's for which the local storage system 101 has determined to execute the differential copy.

The CPU 203 of the local storage system 101 predicts differential copy periods of all the LU's presently belonging to the "LU group subject to determination" based on the information stored in the predicted update data amount table 232 and the predicted usable bandwidth table 231 (S1202).

Specifically, the CPU 203 predicts the differential copy periods based on the steps previously described with reference to FIGS. 7 and 8.

The CPU 203 of the local storage system 101 sums up the differential copy periods of all the LU's in the "LU group subject to determination," and sets the sum to a "total differential copy period" (S1203).

Then, the CPU 203 of the local storage system 101 determines whether the "total differential copy period" is longer than the copy cycle period (S1204).

If the "total differential copy period" is not longer than the copy cycle period ("NO" in the step S1204), the CPU 203 of the local storage system 101 adds all the LU's in the "LU group subject to determination" to the "LU group subject to differential copy" (S1210). Then, the CPU 203 of the local storage system 101 executes the remote copy program 228 to carry out the differential copy of the LU's in the "LU group subject to differential copy" in the ascending order of the RPO (S1211).

On the other hand, if the "total differential copy period" is longer than the copy cycle period ("YES" in the step S1204), the CPU 203 of the local storage system 101 predicts the update data amount of the LU with the minimum RPO occurring during the present copy cycle period based on the information stored in the predicted update data amount table 232. Then, the CPU 203 of the local storage system 101 predicts the next differential copy period of the LU with the minimum RPO based on this prediction result and the information stored in the predicted usable bandwidth table 231 (S1205).

The CPU 203 of the local storage system 101 calculates a period between the completion of the present differential copy and the completion of the next differential copy of the LU with the minimum RPO based on the processed results in the steps S1202 and S1204, and determines whether the calculated result satisfies the RPO of the LU with the minimum RPO (S1206).

If the period between the completion of the present differential copy and the completion of the next differential copy of the LU with the minimum RPO does not satisfy the RPO ("NO" in the step S1206), the CPU 203 of the local storage system 101 removes an LU with the maximum RPO from the LU's in the "LU group subject to determination" (S1207).

The CPU 203 of the local storage system 101 determines whether the "LU group subject to determination" is null (S1208). If the "LU group subject to determination" is not null ("NO" in the step S1208), the CPU 203 of the local storage system 101 carries out the process of the S1203. On the other hand, if the "LU group subject to determination" is null ("YES" in the step S1208), the CPU 203 of the local storage system 101 carries out a process of a step S1209.

The CPU 203 of the local storage system 101, as described with reference to FIG. 6B, carries out the management terminal communication control program 225 to notify the management terminal 103 that the RPO requirement cannot be satisfied. Then, the CPU 304 of the management terminal 103 carries out the storage communication program 311 to receive the transmitted notification. Lastly, the CPU 304 of the management terminal 103 executes the UI control program 310 to display a massage that the RPO requirement cannot be satisfied on the management screen (S1209).

On the other hand, if the period between the completion of the present differential copy and the completion of the next differential copy of the LU with the minimum RPO satisfies the RPO ("YES" in the step S1206), the CPU 203 of the local storage system 101 carries out a process of a step S1220.

The CPU 203 of the local storage system 101 adds the "LU with the minimum RPO" to the "LU group subject to differential copy." Moreover, the CPU 203 of the local storage system 101 removes the "LU with the minimum RPO" from the "LU group subject to determination" (S1220).

The CPU 203 of the local storage system 101 determines whether the "LU group subject to determination" is null (S1221).

If the "LU group subject to determination" is null ("YES" in the step S1221), the CPU 203 of the local storage system 101 carries out the differential copy of the LU's in the "LU group subject to differential copy" in the ascending order of the RPO (S1211).

On the other hand, if the "LU group subject to determination" is not null ("NO" in the step S1221), the CPU 203 of the local storage system 101 carries out the process in the step S1205 again, and repeats this process until the LU group subject to determination becomes null.

According to the embodiment of this invention, for a remote backup using an inexpensive WAN with a fluctuating bandwidth, it is possible to display to the administrator a period required for the backup. The administrator, based on the displayed period required for the backup, can efficiently plan the backup.

Moreover, according to the embodiment of this invention, by prioritizing the differential copy of an LU with a strict RPO requirement, it is possible to determine the order of differential copies so as to satisfy RPO requirements.

While the present invention has been described in detail and pictorially in the accompanying drawings, the present invention is not limited to such detail but covers various obvious modifications and equivalent arrangements, which fall within the purview of the appended claims.

What is claimed is:

1. A storage system providing a storage volume for storing data to be read and written by a host computer, and operating as a main storage system, the storage system being coupled via a network to a secondary storage system for storing a backup of data stored in the storage volume, and comprising:
an interface coupled to the network;
a processor coupled to the interface; and
a memory coupled to the processor,
wherein the processor is configured to:
copy data stored in the storage volume to the secondary storage system, upon receiving an instruction to create a backup of data stored in the storage volume;
record a first size of the data copied from the storage volume to the secondary storage system;
predict a second size of data to be copied at a certain time point afterward based on the first size of the copied data;
record a usable bandwidth of the network at a time when the data stored in the storage volume is copied to the secondary storage system;
predict a usable bandwidth at a certain time point afterward based on the recorded usable bandwidth of the network; and
predict a time period required for copying the data stored in the storage volume to the secondary storage system based on the second size of data to be copied and the predicted usable bandwidth of the network.

2. The storage system according to claim 1, wherein the processor is further configured to predict a time period required for carrying out a differential copy which copies data stored in the storage volume but not copied to the secondary storage system to the secondary storage system based on the second size of data to be copied and the predicted usable bandwidth.

3. The storage system according to claim 2, wherein:
the storage system provides the host computer with a plurality of storage volumes; and
the processor is further configured to:
predict time periods required for the differential copies carried out in the plurality of storage volumes; and
determine whether the differential copies are carried out in the plurality of storage volumes based on the predicted time periods required for the differential copies in the plurality of storage volumes.

4. The storage system according to claim 3, wherein the processor is further configured to determine a sequence of the differential copies based on the predicted time periods required for the differential copies in the plurality of storage volumes.

5. The storage system according to claim 4, wherein the processor is further configured to:
receive inputs of recovery point objectives, which are target times to recover data stored in the plurality of storage volumes, for the plurality of storage volumes; and
determine a sequence of the differential copies based on the input recovery point objectives.

6. The storage system according to claim 5, wherein the processor is further configured to execute the differential copies while prioritizing storage volumes with earlier recovery point objectives.

7. The storage system according to claim 1, wherein the processor is further configured to predict a time period required for an initial copy which copies the entire data stored in the storage volume to the secondary storage system based on the second size of data to be copied and the predicted usable bandwidth.

8. The storage system according to claim 1, wherein:
the storage system provides the host computer with a plurality of storage volumes;
the processor is further configured to:
predict a time period required for executing an initial copy which copies the entire data stored in the storage volume to the secondary storage system based on the predicted size of data to be copied and the predicted usable bandwidth;
predict a time period required for a differential copy which copies updated data to the secondary storage system, upon the host computer updating the data stored in the storage volume while the initial copy is being carried out based on the second size of data to be copied and the predicted usable bandwidth;
receive inputs of recovery point objectives, which are target periods to recover data stored in the plurality of storage volumes, for the plurality of first storage volumes;
determine whether the differential copies are executed for the plurality of storage volumes based on the predicted time periods required for the differential copies and the recovery point objectives; and
determine a sequence of the differential copies, in case of which the differential copies are carried out for the plurality of storage volumes, to execute the differential copies while prioritizing the storage volumes with higher recovery point objectives based on the predicted time periods required for the differential copies and the recovery point objectives.

9. A computer system comprising a primary storage system coupled to a host computer via a network, a secondary storage system coupled to the primary storage system, and a management terminal being capable to access to the primary storage system and the secondary storage system, the primary storage system comprising a first interface coupled to the network, a first processor coupled to the first interface, and a first memory coupled to the first processor, and providing the host computer with a first storage volume where data is written and read, the secondary storage system comprising a second interface coupled to the primary storage system, a second processor coupled to the second interface, and a second memory coupled to the second processor, and storing a backup of data stored in the first storage volume, wherein the primary storage system is configured to:

copy data stored in the first storage volume to the secondary storage system, upon receiving an instruction to create a backup of data stored in the first storage volume;

record a first size of the data copied from the first storage volume to the secondary storage system;

predict a second size of data to be copied at a certain time point afterward based on the first size of the copied data;

record a usable bandwidth of the network at a time when the data stored in the first storage volume is copied to the secondary storage system;

predict a usable bandwidth at a certain time point afterward based on the recorded usable bandwidth of the network; and predict a time period required for copying the data stored in the first storage volume to the secondary storage system based on the second size of data to be copied and the predicted usable bandwidth of the network.

10. The computer system according to claim 9, wherein the primary storage system is further configured to predict a time period required for carrying out a differential copy which copies data stored in the first storage volume but not copied to the second- storage system to the secondary storage system based on the second size of data to be copied and the predicted usable bandwidth.

11. The computer system according to claim 10, wherein the primary storage system is further configured to:

provide the host computer with a plurality of first storage volumes;

predict time periods required for the differential copies carried out in the plurality of first storage volumes; and determine whether the differential copies are carried out in the plurality of first storage volumes based on the predicted time periods required for the differential copies in the plurality of first storage volumes.

12. The computer system according to claim 11, wherein the primary storage system is further configured to determine a sequence of the differential copies based on the predicted time periods required for the differential copies in the plurality of first storage volumes.

13. The computer system according to claim 12, wherein:

the management terminal is configured to:

receive inputs of recovery point objectives, which are target periods to recover data stored in the plurality of first storage volumes, for the plurality of first storage volumes; and transmit the input recovery point objectives to the primary storage system, and the primary storage system is further configured to determine a sequence of the differential copies based on the transmitted recovery point objectives for the plurality of first storage volumes.

14. The computer system according to claim 13, wherein the primary storage system is further configured to execute the differential copies while prioritizing first storage volumes with higher recovery point objectives.

15. The computer system according to claim 11, wherein:

the management terminal is further configured to:

receive a designation of a first storage volume to be backed up; and notify the primary storage system of the designated first storage volume;

the primary storage system is further configured to:

predict a time period required for the differential copy required for creating a backup of the first storage volume notified by the management terminal; and notify the management terminal of the predicted time period required for the differential copy; and the management terminal shows the notified time period required for the differential copy.

16. The computer system according to claim 9, wherein the primary storage system is further configured to predict a time period required for an initial copy which copies the entire data stored in the first storage volume to the secondary storage system based on the second size of data to be copied and the predicted usable bandwidth.

17. The computer system according to claim 16, wherein:

the management terminal is configured to:

receive a designation of a first storage volume to be backed up; and notify the primary storage system of the designated first storage volume;

the primary storage system is further configured to:

predict an initial copy time period required for creating a backup of the first storage volume notified by the management terminal; and notify the management terminal of the predicted initial copy time period; and the management terminal shows the notified initial copy time period.

18. The computer system according to claim 9, wherein:

the primary storage system provides the host computer with a plurality of first storage volumes;

the management terminal is configured to:

receive a designation of a first storage volume to be backed up; and notify the primary storage system of the designated first storage volume;

the primary storage system is further configured to:

predict a time period required for executing an initial copy which copies the entire data stored in the first storage volume to the secondary storage system based on the predicted size of data to be copied and the predicted usable bandwidth;

predict a time period required for a differential copy which copies updated data to the secondary storage system upon the host computer updating the data stored in the first storage volume while the initial copy is being carried out based on the second size of data to be copied and the predicted usable bandwidth; and notify the management terminal of the predicted time period required for the initial copy and the predicted time period required for the differential copy;

the management terminal shows the notified time period required for the initial copy and the notified time period required for the differential copy; and the primary storage system is further configured to:

receive inputs of recovery point objectives, which are target periods to recover data stored in the plurality of first storage volumes, for the plurality of first storage volumes;

determine whether the differential copies are executed for the plurality of first storage volumes based on the predicted time periods required for the differential copies and the recovery point objectives; and determine a sequence of the differential copies, in case of which the differential copies are carried out for the plurality of first storage volumes, to execute the differential copies while prioritizing the first storage volumes with higher recovery point objectives based on the predicted time periods required for the differential copies and the recovery point objectives.

19. A backup management method for a computer system comprising a primary storage system coupled to a host computer via a network, a secondary storage system coupled to the primary storage system, and a management terminal being capable to access to the primary storage system and the secondary storage system, the primary storage system comprising a first interface coupled to the network, a first processor coupled to the first interface, and a first memory coupled to the first processor, and providing the host computer with a first storage volume where data is written or read, the secondary storage system comprises a second interface coupled to the network, a second processor coupled to the second interface, and a second memory coupled to the second processor, and storing a backup of data stored in the first storage volume, the backup management method comprising:

copying, by the first processor, data stored in the first storage volume to the secondary storage system upon receiving an instruction to create a backup of the data stored in the first storage volume;

recording, by the first processor, a first size of the data copied from the first storage volume to the secondary storage system;

predicting, by the first processor, a second size of data to be copied at a certain time afterward based on the first size of the copied data;

recording, by the first processor, a usable bandwidth of the network at a time when the data stored in the first storage volume is copied to the secondary storage system;

predicting, by the first processor, a usable bandwidth at a certain time point afterward based on the recorded usable bandwidth of the network; and predicting, by the first processor, a time period required for copying the data stored in the first storage volume to the secondary storage system based on the second size of data to be copied and the predicted usable bandwidth of the network.

* * * * *